United States Patent [19]

Rallison et al.

[11] Patent Number: 5,903,395
[45] Date of Patent: *May 11, 1999

[54] PERSONAL VISUAL DISPLAY SYSTEM

[75] Inventors: Richard Dennis Rallison, Paradise, Utah; C. Gregory Amadon; Wolfgang Adam Mack, Jr., both of Seattle, Wash.; Leo Nikora, Bellevue, Wash.

[73] Assignee: i-O Display Systems LLC, Menlo Park, Calif.

[*] Notice: This patent is subject to a terminal disclaimer.

[21] Appl. No.: 08/416,919

[22] PCT Filed: Aug. 31, 1994

[86] PCT No.: PCT/US94/09819

§ 371 Date: Apr. 21, 1995

§ 102(e) Date: Apr. 21, 1995

[87] PCT Pub. No.: WO95/21395

PCT Pub. Date: Aug. 10, 1995

[51] Int. Cl.[6] .............................. G02B 27/14; G09G 5/00
[52] U.S. Cl. ................................. 359/630; 345/8
[58] Field of Search ..................... 359/630, 633, 359/631, 632; 345/8

[56] References Cited

U.S. PATENT DOCUMENTS

| D. 300,476 | 3/1989 | Sestak ..................................... D29/18 |
| D. 301,644 | 6/1989 | Sestak ..................................... D29/18 |
| D. 334,557 | 4/1993 | Hunter et al. .......................... D14/114 |
| D. 334,742 | 4/1993 | Hunter et al. .......................... D14/113 |
| D. 337,320 | 7/1993 | Hunter et al. .......................... D14/113 |
| D. 338,514 | 8/1993 | Holmes .................................. D21/240 |
| 2,411,933 | 12/1946 | Morley et al. ................................. 2/14 |
| 2,955,156 | 10/1960 | Heilig ....................................... 178/6.5 |
| 2,958,258 | 11/1960 | Kelly ............................................ 88/24 |

(List continued on next page.)

FOREIGN PATENT DOCUMENTS

| 91309108 | 10/1991 | European Pat. Off. . |
| 0 461 942 A1 | 12/1991 | European Pat. Off. .......... G09B 9/32 |
| 0 551 781 | 7/1993 | European Pat. Off. ........ G02B 27/00 |
| 2517916 | 6/1983 | France ............................. H04N 9/54 |
| 2 672 565 | 8/1992 | France ........................... B64D 10/00 |
| 224691 | 7/1910 | Germany . |
| 3532730 | 3/1987 | Germany ......................... A61B 1/04 |
| 3628458 | 2/1988 | Germany ......................... H04N 1/20 |

(List continued on next page.)

OTHER PUBLICATIONS

Antonoff, "Real estate is cheap here, but the places you'd most want to visit are still under construction", *Popular Science,* Jun. 1993, pp. 83–86, 124–125.

Burley, et al., "A full–color wide–field–of–view holographic helmet–mounted display for pilot/vehicle interface development and human factors studies", *SPIE,* vol. 1290 Helmet–Mounted Displays II (1990), pp. 9–15.

Carr, "Is Virtual Reality Virtually Here?", *Training & Development,* Oct. 1992, pp. 37–41.

(List continued on next page.)

*Primary Examiner*—Georgia Epps
*Assistant Examiner*—Ricky Mack
*Attorney, Agent, or Firm*—Sheridan Ross P.C.

[57] ABSTRACT

A visual display device is provided for delivering a generated image, preferably combinable with environment light, to the eye of a user. The device is lightweight and compact but yields a high quality image. In one embodiment, a color shutter provides a high-density color image. In one embodiment, a shroud protects from stray light and holds optical elements in desired alignment. In one embodiment an image generator is masked by at least two masks to provide for a high quality image without waste. In one embodiment, a removably mounted shield or activatable device can convert the apparatus from a see-through device to an immersion device and back again. In one embodiment, the device can be comfortably mounted to the user's head while still allowing for use of conventional eyeglasses. In one embodiment various controls, such as a mute button, volume control and the like can be provided, such as by mounting on the head-mounted display device.

6 Claims, 10 Drawing Sheets

U.S. PATENT DOCUMENTS

| | | | |
|---|---|---|---|
| 3,043,910 | 7/1962 | Hicks | 178/7.85 |
| 3,212,102 | 10/1965 | Müller | 2/12 |
| 3,589,795 | 6/1971 | Miyazaki et al. | 350/96 B |
| 3,614,314 | 10/1971 | Rossire | 178/7.88 |
| 3,629,870 | 12/1971 | Paisley | 2/15 |
| 3,874,783 | 4/1975 | Cole | 350/96 B |
| 3,915,548 | 10/1975 | Opittek et al. | 350/3.5 |
| 3,923,370 | 12/1975 | Mostrom | 350/55 |
| 3,940,204 | 2/1976 | Withrington | 350/3.5 |
| 4,021,862 | 5/1977 | Glasser et al. | 2/431 |
| 4,026,641 | 5/1977 | Bosserman et al. | 350/298 |
| 4,028,725 | 6/1977 | Lewis | 358/103 |
| 4,042,957 | 8/1977 | Ellis | 358/109 |
| 4,048,653 | 9/1977 | Spooner | 358/104 |
| 4,231,117 | 11/1980 | Aileo | 2/6 |
| 4,257,062 | 3/1981 | Meredith | 358/81 |
| 4,269,476 | 5/1981 | Gauthier et al. | 350/174 |
| 4,310,849 | 1/1982 | Glass | 358/88 |
| 4,322,135 | 3/1982 | Freeman | 350/410 |
| 4,348,185 | 9/1982 | Breglia et al. | 434/43 |
| 4,361,384 | 11/1982 | Bosserman | 350/174 |
| 4,385,803 | 5/1983 | Ellis | 350/174 |
| 4,395,731 | 7/1983 | Schoolman | 358/88 |
| 4,398,799 | 8/1983 | Swift | 350/174 |
| 4,437,113 | 3/1984 | Lee et al. | 358/93 |
| 4,439,157 | 3/1984 | Breglia et al. | 434/40 |
| 4,446,480 | 5/1984 | Breglia et al. | 358/104 |
| 4,465,347 | 8/1984 | Task et al. | 350/538 |
| 4,468,101 | 8/1984 | Ellis | 350/538 |
| 4,550,984 | 11/1985 | Reymond | 350/404 |
| 4,559,555 | 12/1985 | Schoolman | 358/88 |
| 4,561,723 | 12/1985 | Hamano et al. | 350/331 R |
| 4,571,628 | 2/1986 | Thornton | 358/224 |
| 4,630,321 | 12/1986 | Sagemuehl et al. | 2/426 |
| 4,633,324 | 12/1986 | Giulie | 358/255 |
| 4,636,866 | 1/1987 | Hattori | 358/236 |
| 4,641,931 | 2/1987 | Loy | 350/538 |
| 4,651,201 | 3/1987 | Schoolman | 358/98 |
| 4,652,870 | 3/1987 | Steward | 340/705 |
| 4,695,129 | 9/1987 | Faessen et al. | 350/96.25 |
| 4,703,522 | 11/1987 | Schürle et al. | 2/432 |
| 4,706,117 | 11/1987 | Schoolman | 358/88 |
| 4,711,512 | 12/1987 | Upatnieks | 350/3.7 |
| 4,722,601 | 2/1988 | McFarlane | 356/152 |
| 4,726,075 | 2/1988 | Hinrichs | 2/13 |
| 4,737,972 | 4/1988 | Schoolman | 378/41 |
| 4,743,200 | 5/1988 | Welch et al. | 434/43 |
| 4,751,746 | 6/1988 | Rustin | 2/13 |
| 4,753,514 | 6/1988 | Kubik | 350/174 |
| 4,757,714 | 7/1988 | Purdy et al. | 73/597 |
| 4,761,056 | 8/1988 | Evans et al. | 350/174 |
| 4,763,990 | 8/1988 | Wood | 350/320 |
| 4,775,217 | 10/1988 | Ellis | 350/538 |
| 4,784,468 | 11/1988 | Tierney | 350/276 R |
| 4,785,481 | 11/1988 | Palmer et al. | 2/436 |
| 4,786,966 | 11/1988 | Hanson et al. | 358/108 |
| 4,796,987 | 1/1989 | Linden | 351/158 |
| 4,797,736 | 1/1989 | Kloots et al. | 358/93 |
| 4,799,765 | 1/1989 | Ferrer | 350/174 |
| 4,805,988 | 2/1989 | Dones | 350/137 |
| 4,806,011 | 2/1989 | Bettinger | 351/158 |
| 4,807,202 | 2/1989 | Cherri et al. | 367/129 |
| 4,826,287 | 5/1989 | Cook et al. | 350/174 |
| 4,853,764 | 8/1989 | Sutter | 358/3 |
| 4,859,030 | 8/1989 | Rotier | 350/174 |
| 4,859,031 | 8/1989 | Berman et al. | 350/174 |
| 4,863,242 | 9/1989 | Correa | 350/276 R |
| 4,864,190 | 9/1989 | Orr | 313/478 |
| 4,865,420 | 9/1989 | Schmidt | 350/276 R |
| 4,867,551 | 9/1989 | Perera | 351/158 |
| 4,868,930 | 9/1989 | Blackstone | 2/439 |
| 4,869,575 | 9/1989 | Kubik | 350/174 |
| 4,874,214 | 10/1989 | Cheyason et al. | 350/3.7 |
| 4,874,235 | 10/1989 | Webster | 351/201 |
| 4,884,137 | 11/1989 | Hanson et al. | 358/108 |
| 4,884,219 | 11/1989 | Waldren | 364/514 |
| 4,897,715 | 1/1990 | Beamon | 358/93 |
| 4,900,133 | 2/1990 | Berman | 350/346 |
| 4,902,083 | 2/1990 | Wells | 350/6.6 |
| 4,902,116 | 2/1990 | Ellis | 350/501 |
| 4,902,120 | 2/1990 | Weyer | 351/158 |
| 4,904,049 | 2/1990 | Hegg | 350/96.27 |
| 4,930,888 | 6/1990 | Freisleben et al. | 356/152 |
| 4,932,731 | 6/1990 | Suzuki et al. | 350/3.7 |
| 4,933,755 | 6/1990 | Dahl et al. | 358/88 |
| 4,934,773 | 6/1990 | Becker | 350/6.6 |
| 4,952,024 | 8/1990 | Gale | 350/143 |
| 4,961,625 | 10/1990 | Wood et al. | 350/174 |
| 4,961,626 | 10/1990 | Fournier et al. | 350/174 |
| 4,968,123 | 11/1990 | Fournier et al. | 350/538 |
| 4,969,714 | 11/1990 | Fournier et al. | 353/174 |
| 4,969,724 | 11/1990 | Ellis | 350/503 |
| 4,970,589 | 11/1990 | Hanson et al. | 358/108 |
| 4,982,278 | 1/1991 | Dahl et al. | 358/88 |
| 4,983,014 | 1/1991 | Nattermann | 350/96.24 |
| 4,984,179 | 1/1991 | Waldern | 364/514 |
| 4,993,790 | 2/1991 | Vick | 350/3.73 |
| 4,995,165 | 2/1991 | Daniels | 33/361 |
| 5,003,300 | 3/1991 | Wells | 340/705 |
| 5,005,213 | 4/1991 | Hanson et al. | 455/617 |
| 5,015,072 | 5/1991 | Howell | 350/276 R |
| 5,019,828 | 5/1991 | Schoolman | 342/457 |
| 5,034,809 | 7/1991 | Katoh | 358/88 |
| 5,035,473 | 7/1991 | Kuwayama et al. | 350/3.7 |
| 5,039,198 | 8/1991 | VanBeek | 385/117 |
| 5,046,827 | 9/1991 | Frost et al. | 359/54 |
| 5,050,966 | 9/1991 | Berman | 359/38 |
| 5,053,755 | 10/1991 | Smith et al. | 340/705 |
| 5,069,529 | 12/1991 | Takahashi | 359/601 |
| 5,081,542 | 1/1992 | Efron et al. | 359/41 |
| 5,089,903 | 2/1992 | Kuwayama et al. | 359/15 |
| 5,091,719 | 2/1992 | Beamon | 340/705 |
| 5,101,298 | 3/1992 | Lentz et al. | 359/612 |
| 5,115,345 | 5/1992 | Hobson et al. | 359/601 |
| 5,121,253 | 6/1992 | Waintroob | 359/601 |
| 5,123,726 | 6/1992 | Webster | 351/201 |
| 5,124,821 | 6/1992 | Antier et al. | 359/14 |
| 5,129,716 | 7/1992 | Holakovszky et al. | 351/50 |
| 5,130,794 | 7/1992 | Ritchey | 358/87 |
| 5,138,555 | 8/1992 | Albrecht | 364/424.06 |
| 5,146,623 | 9/1992 | Paysan et al. | 2/12 |
| 5,151,722 | 9/1992 | Massof et al. | 351/158 |
| 5,155,627 | 10/1992 | Keehn et al. | 359/609 |
| 5,162,828 | 11/1992 | Furness et al. | 353/122 |
| 5,162,928 | 11/1992 | Taniguchi et al. | 359/13 |
| 5,164,848 | 11/1992 | Firth et al. | 359/13 |
| 5,166,778 | 11/1992 | Beamon | 358/3 |
| 5,170,153 | 12/1992 | Migozzi et al. | 340/705 |
| 5,182,817 | 2/1993 | Branum | 2/439 |
| 5,184,231 | 2/1993 | Ellis | 359/13 |
| 5,189,512 | 2/1993 | Cameron et al. | 358/93 |
| 5,192,960 | 3/1993 | Komamura | 351/41 |
| 5,198,928 | 3/1993 | Chauvin | 359/465 |
| 5,200,844 | 4/1993 | Suvada | 359/40 |
| 5,216,759 | 6/1993 | Hewitt et al. | 2/439 |
| 5,231,379 | 7/1993 | Wood et al. | 340/705 |
| 5,255,211 | 10/1993 | Redmond | 364/578 |
| 5,274,405 | 12/1993 | Webster | 351/158 |
| 5,274,501 | 12/1993 | Stroll | 359/613 |
| 5,276,471 | 1/1994 | Yamauchi et al. | 351/153 |
| 5,278,680 | 1/1994 | Karasawa et al. | 359/40 |
| 5,281,957 | 1/1994 | Schoolman | 345/8 |

| | | | |
|---|---|---|---|
| 5,293,271 | 3/1994 | Merritt et al. | 359/858 |
| 5,300,942 | 4/1994 | Dolgoff | 345/32 |
| 5,303,085 | 4/1994 | Rallison | 359/631 |
| 5,305,244 | 4/1994 | Newman et al. | 364/708.1 |
| 5,309,169 | 5/1994 | Lippert | 345/8 |
| 5,321,416 | 6/1994 | Bassett et al. | 345/8 |
| 5,322,441 | 6/1994 | Lewis et al. | 434/307 |
| 5,323,174 | 6/1994 | Klapman et al. | 345/156 |
| 5,327,175 | 7/1994 | Kim | 348/526 |
| 5,331,149 | 7/1994 | Spitzer et al. | 250/221 |
| 5,334,991 | 8/1994 | Wells et al. | 345/8 |
| 5,335,299 | 8/1994 | Atkinson | 382/56 |
| 5,347,400 | 9/1994 | Hunter | 359/815 |
| 5,353,042 | 10/1994 | Klapman et al. | 345/156 |
| 5,357,372 | 10/1994 | Chen et al. | 359/637 |
| 5,373,857 | 12/1994 | Travers et al. | 128/782 |
| 5,383,053 | 1/1995 | Hegg et al. | 359/486 |
| 5,392,158 | 2/1995 | Tosaki | 359/633 |
| 5,408,346 | 4/1995 | Trissel et al. | 359/65 |
| 5,422,715 | 6/1995 | Clarke | 356/141.3 |
| 5,432,626 | 7/1995 | Sasuga | 359/83 |
| 5,451,976 | 9/1995 | Ito | 345/8 |
| 5,486,841 | 1/1996 | Hara | 345/8 |
| 5,513,041 | 4/1996 | Togino | 359/631 |
| 5,526,184 | 6/1996 | Tokuhashi et al. | 359/630 |
| 5,528,262 | 6/1996 | McDowall | 345/151 |

FOREIGN PATENT DOCUMENTS

| | | | |
|---|---|---|---|
| 4225589A1 | 2/1994 | Germany | G09F 9/00 |
| 59-117889 | 7/1984 | Japan | H04N 9/54 |
| 59-219092 | 12/1984 | Japan | H04N 9/54 |
| 62-272698 | 11/1987 | Japan . | |
| 63-82192 | 4/1988 | Japan . | |
| 63-177689 | 7/1988 | Japan . | |
| 1-61723 | 3/1989 | Japan . | |
| 5-46161 | 2/1993 | Japan | G09G 5/36 |
| 6-59217 | 3/1994 | Japan | G02B 27/28 |
| 2 143 948 | 2/1985 | United Kingdom | G01C 1/00 |
| 2266385 | 10/1993 | United Kingdom | G02B 23/10 |
| 2270775 | 3/1994 | United Kingdom | G02B 27/02 |
| 2 279 201 | 12/1994 | United Kingdom | H04R 1/10 |
| 2 281 846 | 3/1995 | United Kingdom | A45F 3/00 |
| 84/01680 | 4/1984 | WIPO | H04N 5/64 |
| WO 92/03756 | 3/1992 | WIPO | G02B 27/00 |
| 93/23783 | 11/1993 | WIPO . | |
| 93/01434 | 1/1994 | WIPO | G02B 27/00 |
| WO 94/11855 | 5/1994 | WIPO | G09G 3/02 |
| WO 94/14152 | 6/1994 | WIPO | G09G 3/02 |
| WO 94/24658 | 10/1994 | WIPO | G09G 3/02 |
| WO 95/10061 | 4/1995 | WIPO | G02B 26/10 |
| WO 95/10106 | 4/1995 | WIPO | G09G 3/02 |

OTHER PUBLICATIONS

Fisher et al., "Living in a Virtual World", *BYTE,* Jul. 1990, pp. 215–221.

Horn, "Seeing the invisible", *U.S. News & World Report,* Jan. 28, 1991.

James, "Goggles Brighten Dark Subway", *The New York Times,* Apr. 10, 1992.

Jones et al., "Evaluation of conformal and body–axis attitude information for spatial awareness", *SPIE,* vol. 1695 Helmet–Mounted Displays III (1992), pp. 146–153.

Starks, "Stereoscopic video and the quest for virtual reality: an annotated bibliography of selected topics", *SPIE,* vol. 1457 Stereoscopic Displays and Applications II (1991), pp. 327–343.

Stewart, "Through the looking glass into an artificial world—via computer", *Smithsonian,* vol. 21, No. 10, Jan. 1991, pp. 36–45.

Assenheim et al., "Large–Screen–Projection, Avionic, and Helmet–Mounted Displays", Proceedings, The International Society for Optical Engineering, Feb. 26–28, 1991, vol. 1456, pp. 179–190.

Benton, "Practical Holography VIII", Proceedings, The International Society for Optical Engineering, Feb. 7–9, 1994, vol. 2176, pp. 241–248.

Driscoll et al., *Handbook of Optics,* McGraw–Hill Book Company, 1978, p. 13–6.

Fischer, "Fundamentals and Optics for Head Mounted Displays", Photonics West '95, Feb. 4–10, 1995.

Rotier, "Optical Approaches to the Helmet Mounted Display", *SPIE,* 1989, vol. 1116, pp. 14–17.

Sony, "Visortron" advertisement.

"Survey of Head Mounted Displays", *Real Time Graphics,* Aug. 1994, vol. 3, No. 2, pp. 1, 8–12.

Virtual I/O, Inc., "PDS Gamer™" advertisement.

*VR News,* Dec. 1994, vol. 3, Issue 10, pp. 4, 8, 12.

"Airlines Weigh Benefits, Costs of At–Seat Video", *Aviation Week & Space Technology,* Aug. 15, 1994, pp. 44–45.

Pope, "Say ahhh! Videos help you relax", *The Times–Picayune,* Oct. 25, 1994, p. 1, A–6.

Farmer, "The right solution to the right problem . . . now", *Comdex Daily,* Nov. 15, 1994, p. 4.

Siggraph, *Nikkei Electronics,* Aug. 22, 1994, pp. 13–14.

Virtual I/O, "i–glasses!", *Twice CES Daily,* Jan. 6, 1995, p. 30.

Virtual I/O, Specifications, *Virtual Reality World,* Nov./Dec. 1994, p. 11.

Virtual I/O, *VR News,* Aug./Sep. 1994, p. 17.

Foley, Interfaces for Advanced Computing, *Scientific American,* Oct. 1987, vol. 257, No. 4, pp. 126–135.

Krueger, *Artificial Reality II,* 1991 Addison–Wesley Publishing Company, Inc., pp. 66–82, 102–116, 130–149, 179–182, 237–239, 267–279.

Sutherland, "A head–mounted three dimensional display", Fall Joint Computer Conference, 1968, pp. 757–763.

Zintsmaster, "Wide–Eye™ Helmet Mounted Display System for Rotorcraft Applications", *IEEE,* Oct. 25, 1993, pp. 27–31.

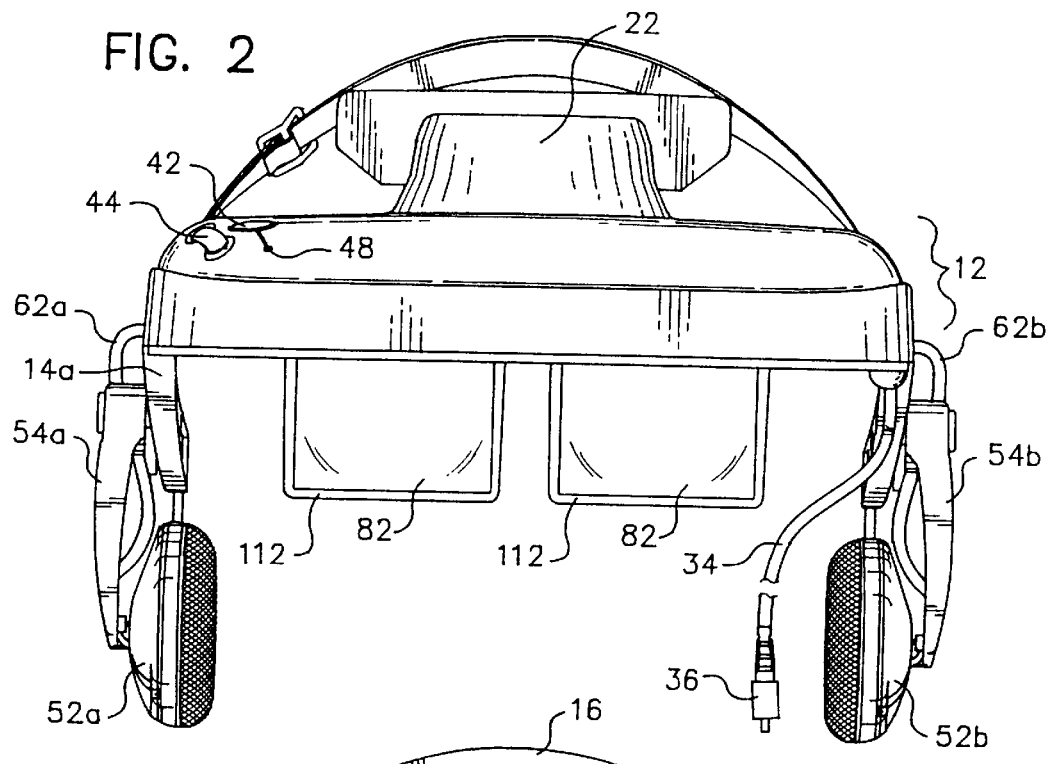
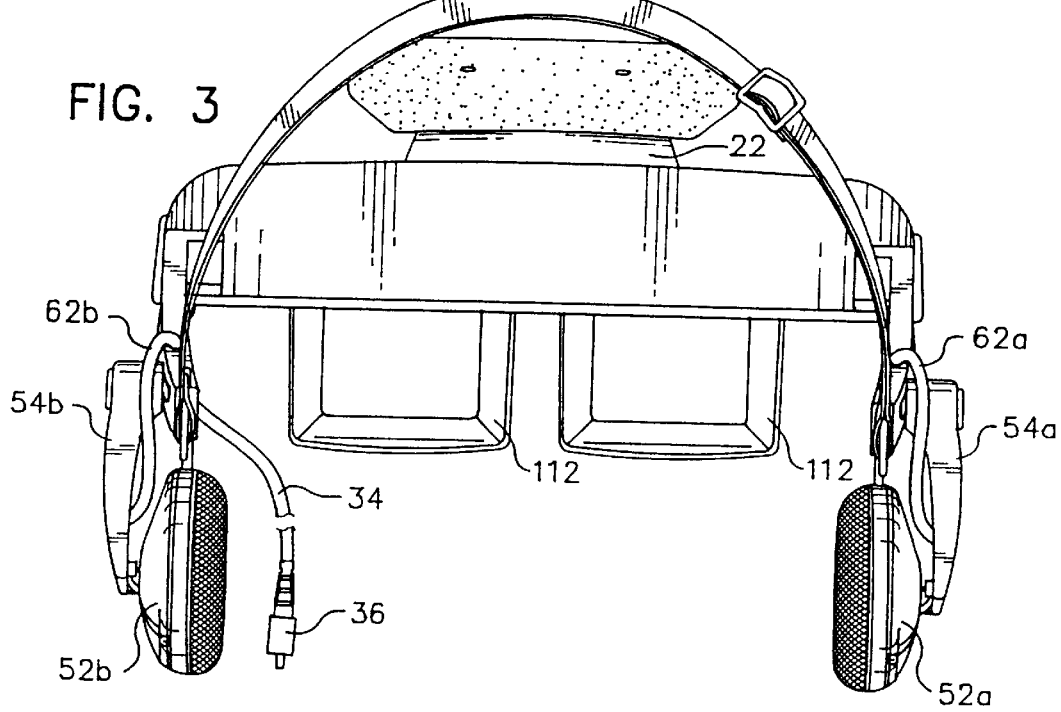

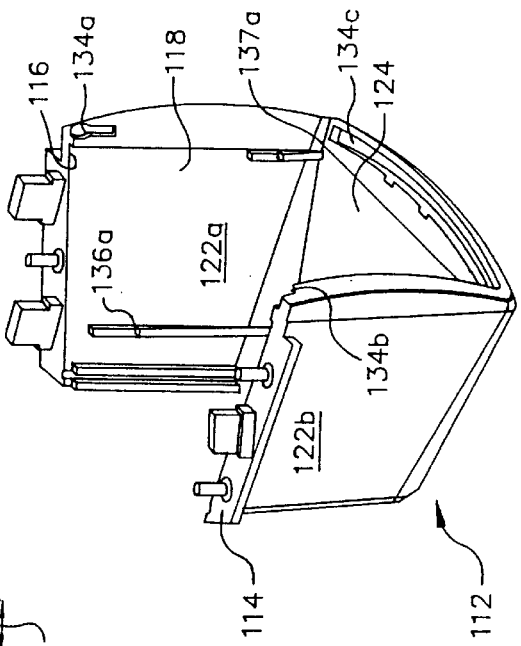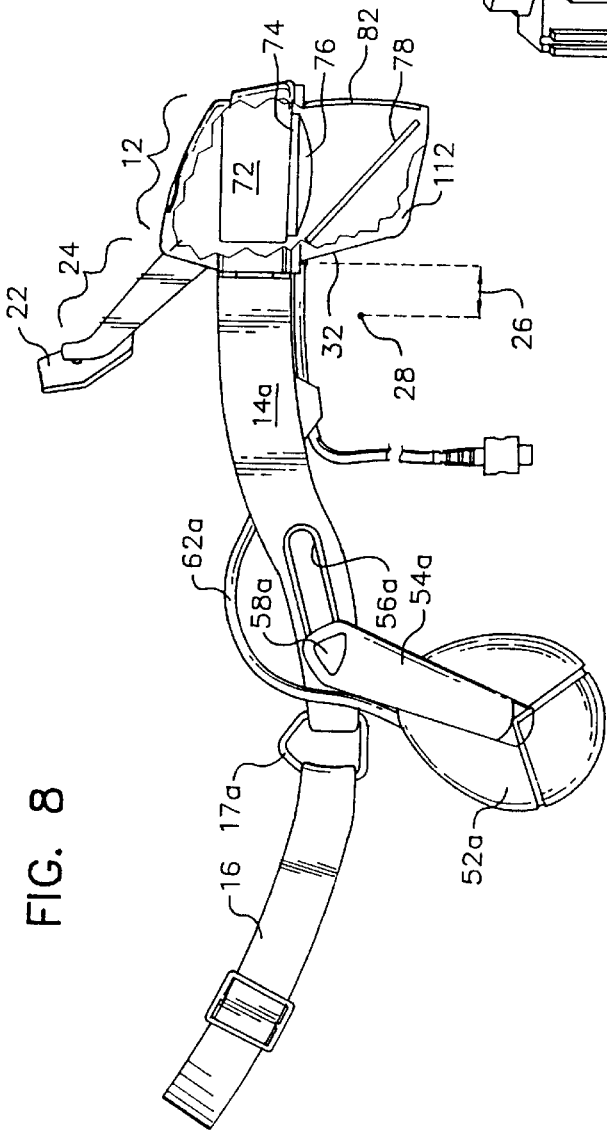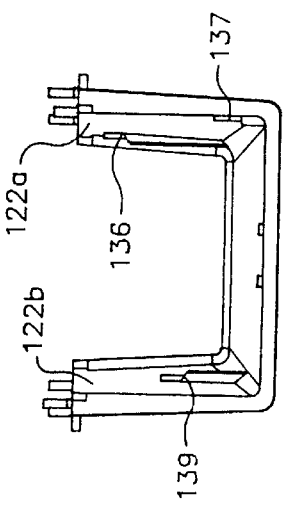

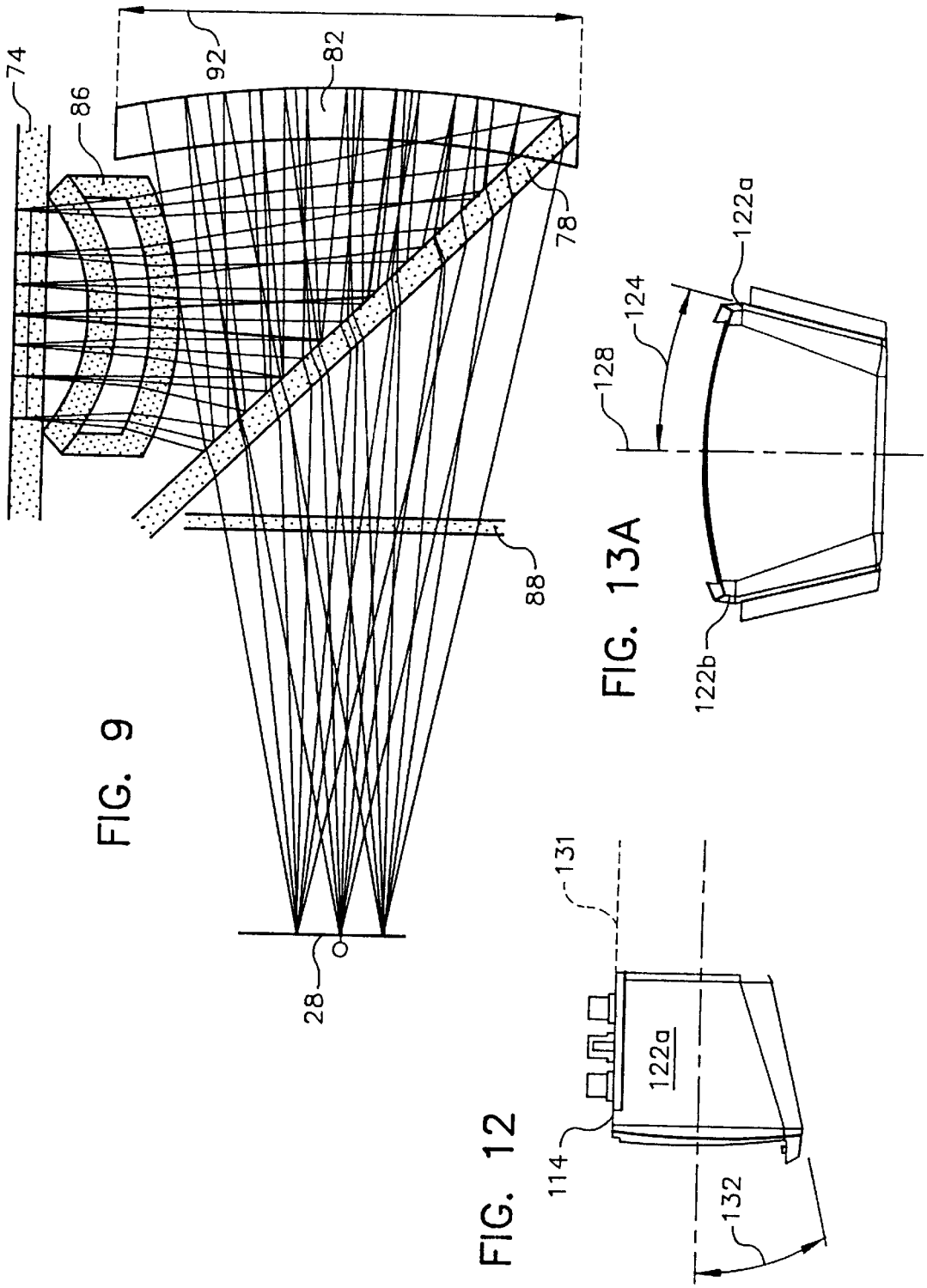

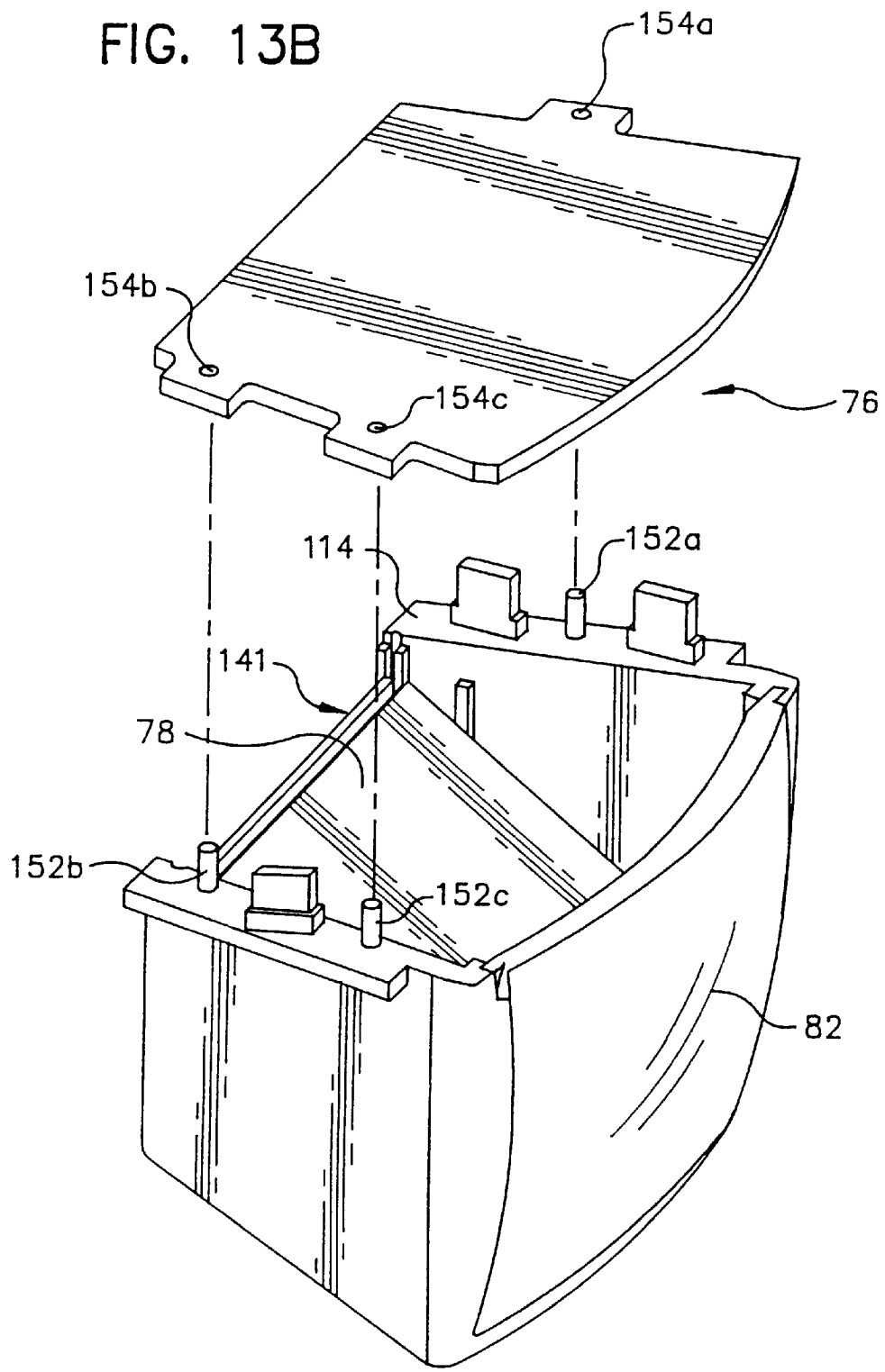

PERSONAL VISUAL DISPLAY SYSTEM

This invention relates to visual displays which preferably can combine generated images with a view of the environment surrounding a user and transmit such combined visual information to the eye position of the user.

BACKGROUND OF THE INVENTION

It is often desirable to provide visual information to a living being. Frequently, one wishes to superimpose such visual information upon the being's view of the real world. In other applications, it is desired to shield the user from a view of the environment, providing an exclusive view of the visual information.

Such displays include a number of components including, in a form known as a folded catadioptric display, an image generator, a beam splitter which receives the image light from the image generator, often via a series of lenses and other optic elements and sends a fraction, designated the reflected fraction, of such image light to a reflective combiner that is either non-transmissive or both allows light from the real world to pass through such combiner and reflects the image light such that both the real-world light and the image light are transmitted to the eye of the user through the beam splitter, often via another series of lenses or other optical elements. The beam splitter will transmit a fraction, designated the transmitted fraction, of the image light reflected from the collimator-combiner. In embodiments in which the combiner is at least partially transmissive, a fraction of the real-world light is also transmitted by the beam splitter.

Previous devices included a number of additional components. Some devices have included corrective optical elements. Other devices have included a depixelator, e.g., as described in PCT/US94/01390 filed Feb. 7, 1994 for "Depixelated Visual Display" (incorporated herein by reference). Still other devices have included apparatus for intensifying the visual display such as those described in PCT/US94/01391, filed Feb. 7, 1994 for "Intensified Visual Display" (incorporated herein by reference).

In designing a system for providing a generated image to the eye or eyes of a user, various factors are often in opposition. Although it is desirable to provide an image which has high quality so as to not only provide a pleasing and attractive display for the user but also to reduce eyestrain, very often the techniques used to produce such a pleasing image have been contrary to goals of an apparatus which is lightweight, low-cost, and relatively easy to design, fabricate and/or repair. Many previous devices have required expensive and heavy series of optical elements such as lenses to achieve a desired picture quality. Other devices have simply accepted a lower-quality image in order to achieve goals of low-cost or light weight. For example, some previous devices have failed to provide a flat focal field to the user. Others have resulted in a poor image contrast, particularly at high viewing angles of the image. Many devices have deprived the user of the full image in order to mask-off unwanted light near the edge of an image generator.

Accordingly, it would be useful to provide a personal, visual display apparatus which provides a high quality of image, which is low cost, lightweight, comfortable and has increased ease of design, fabrication, repair and the like.

SUMMARY OF THE INVENTION

One embodiment of the invention is a head-mounted display (HMD) that can project an image from an image generator such as a cathode ray tube (CRT) or a liquid crystal display (LCD) to one or each of the eyes of the observer or both transmit such an image and combine it with a direct view of the surrounding environment. The combiner images a CRT or LCD display surface mounted above the eye with a simple metallic, dielectric or holographic fold mirror reflecting the image towards the combiner.

According to one aspect of the present invention, the device simplifies the imaging optics by reducing the total number of elements. One embodiment of the invention consists of an image generator such as a CRT or LCD, a combiner such as a spherical metallic, dielectric or holographic combiner or collimator-combiner and a fold mirror such as a metallic, dielectric or holographic fold mirror.

In one embodiment, few optical elements are needed to achieve the desired high quality image. Preferably, the visual display is simplified and made lightweight and less expensive by eliminating the need for certain optic elements such as relay lenses or additional corrective refractive optics. In one embodiment, a visual display provides for monochromatic and/or three-color display without refractive optics, such as by using reflective imaging optics only.

In one embodiment of the invention, the apparatus provides a high-quality image while using a lightweight and visually attractive configuration. In one embodiment, the apparatus is a glasses-like structure with optics configured to deliver an image to the user's eye position, preferably to deliver generated images to the left and right eyes of a user, and with temple pieces projecting backward on each side of the user's head in the fashion of eyeglasses. A strap may be used to assist in holding the device in a desired location. Headphone-like loud speakers are positionable near the user's ears to provide simultaneous video and audio to the user. In one embodiment, a brace is used to contact the user's forehead to further assist in proper positioning and weight-bearing. This configuration is particularly useful when it is desired to leave enough space between the apparatus and the user's eyes to accommodate ordinary eyeglasses. Preferably, various controls are available such as being mounted on the head-mountable apparatus. These can include, for example, a mute button such as an audio and video mute, volume control, image selector and the like. Preferably, the temple pieces can be folded, similarly to folding of typical eyeglasses to achieve a compact storage or carrying configuration.

In one embodiment, the display device is modifiable by addition, preferably snap-on addition, of further components. For example, a light shield may be snapped on to convert a see-through display into an immersion display. Head position tracker components can be snapped on to provide an indication, e.g., to a computer and/or video game device, of the orientation, movement, and/or location of the user's head.

In one embodiment, an optical element is configured to reduce or eliminate loss of image contrast such as that which may occur from an image generated by a backlit LCD display, particularly near the edges of the image. In one embodiment, a color display with high density is provided by the combination of a white or monochrome display coupled with a color shutter. In one embodiment, the shutter is located spaced from the screen or output plane of the image generator, and may be positioned substantially immediately in front of the eyes of the user. In another embodiment the shutter is located adjacent to the image generator output plane or to an optical element, such as a field curvature correction lens, which is adjacent to the image generator output plane.

According to one embodiment, shrouds provide proper shielding, holding and alignment of various components of the device. A shroud can be configured to not only block stray light but also to hold, for example, a fold mirror and/or combiner. In one embodiment, two or more masks are provided for the image generator to achieve elimination of unwanted light source angles without masking desired portions of the image. Preferably, such masks are provided as a unitary piece which can also function to hold other elements such as the LCD or other image generator, a light source, a lens, etc. By providing for an adjustment in the position of such a holder, it is possible to correct positional disparity, particularly vertical positional disparity between the left and right image generators when the apparatus is used in a binocular fashion.

BRIEF DESCRIPTION OF THE DRAWINGS

FIG. 2 is a front view of the apparatus of FIG. 1;

FIG. 3 is a rear view of the apparatus of FIG. 1;

FIG. 8 is a plan view similar to that of FIG. 4 but having portions cut away to show interior components thereof;

FIG. 9 is a schematic side view showing optical components according to one embodiment of the present invention;

FIG. 10 is a perspective view of an optical shroud according to one embodiment of the present invention;

FIG. 11 is a front view of an the optical shroud of FIG. 10;

FIG. 12 is a side view of the optical shroud of FIG. 10;

FIG. 13A is a bottom plan view of the optical shroud of FIG. 10;

FIG. 13B is a partially exploded perspective view of the optical shroud of FIG. 10, fold mirror, combiner and field curvature correction lens;

DETAILED DESCRIPTION OF THE PREFERRED EMBODIMENTS

Figure 1:
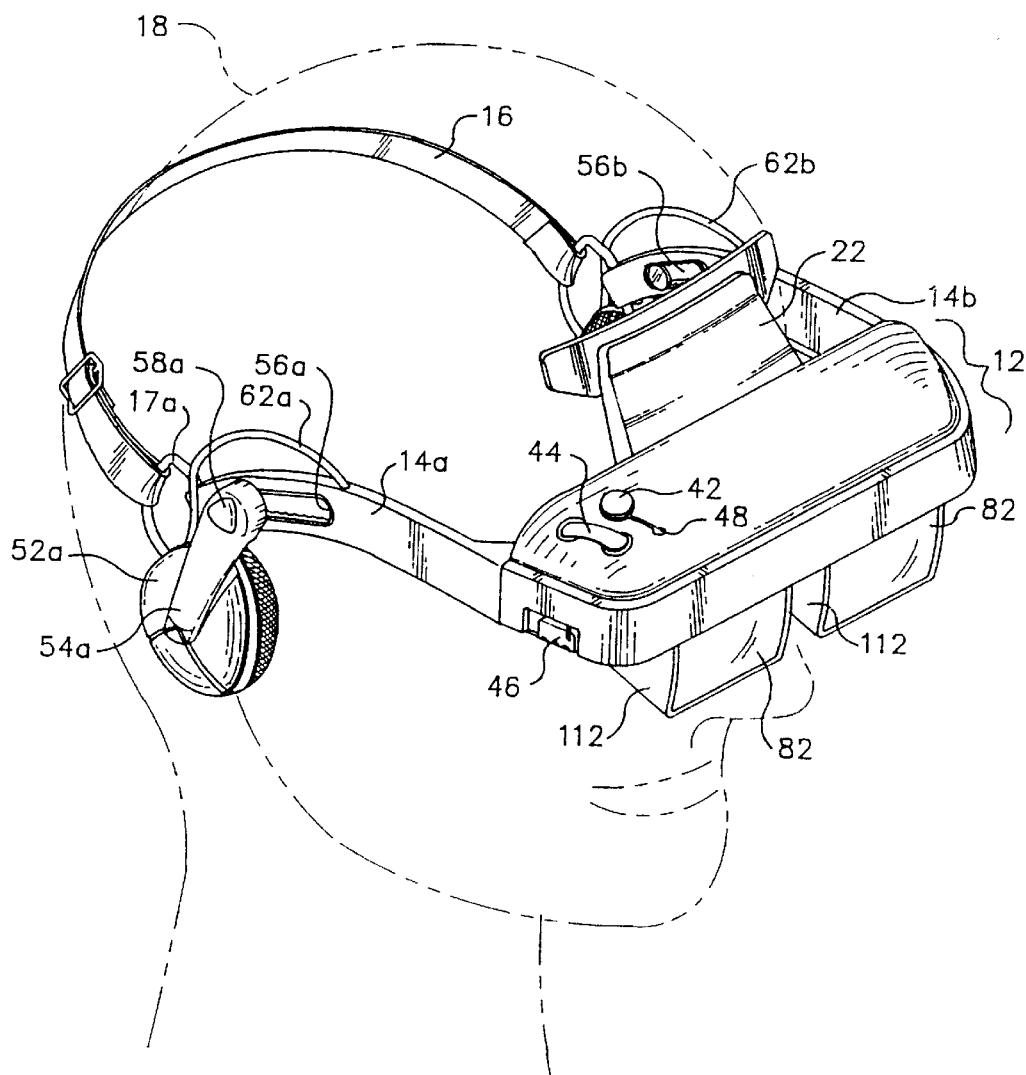
FIG. 1 is a perspective view of a head-mounted display according to one embodiment of the present invention.
Figure 4:
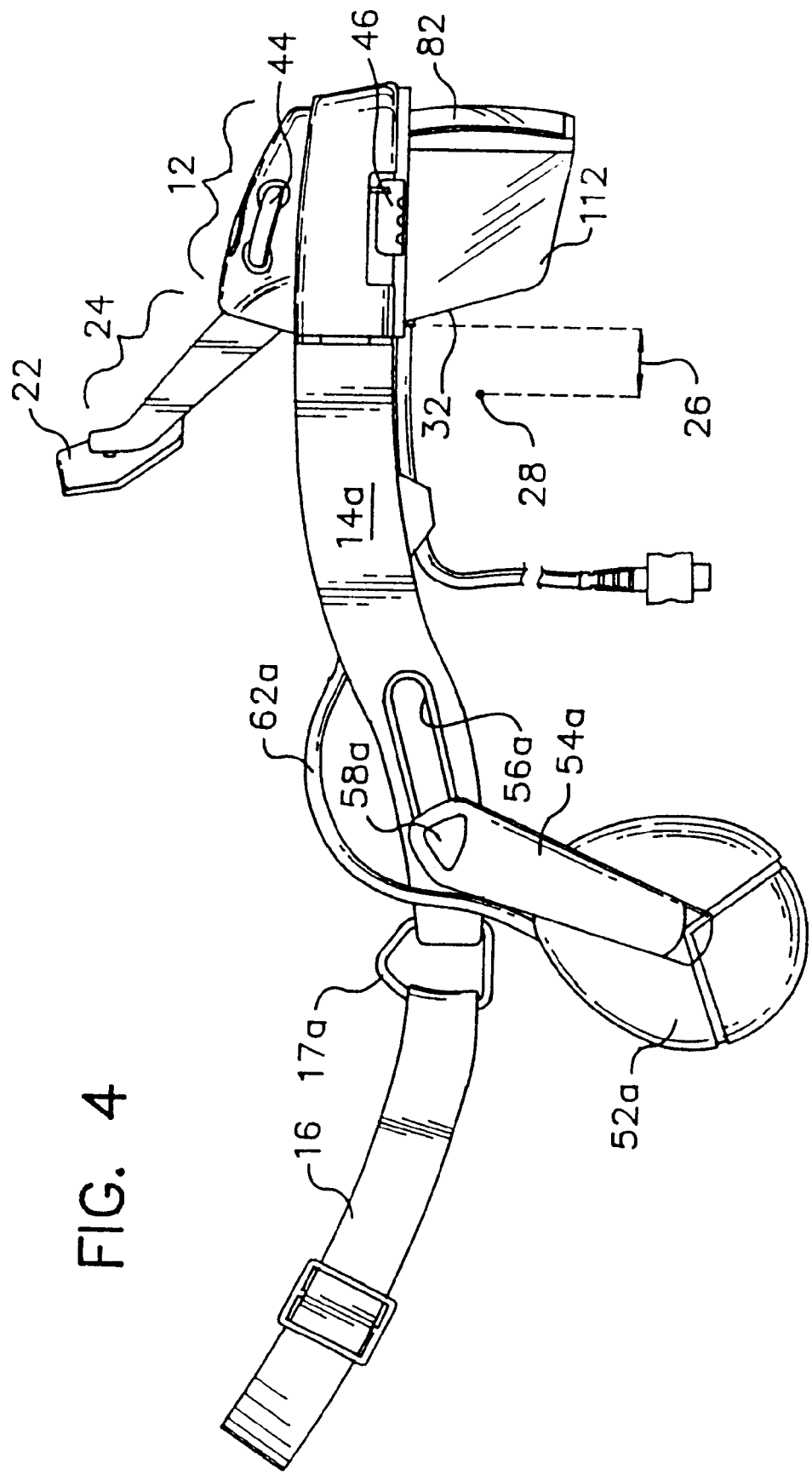
FIG. 4 is a right side elevational view of the apparatus of FIG. 1.
Figure 5:
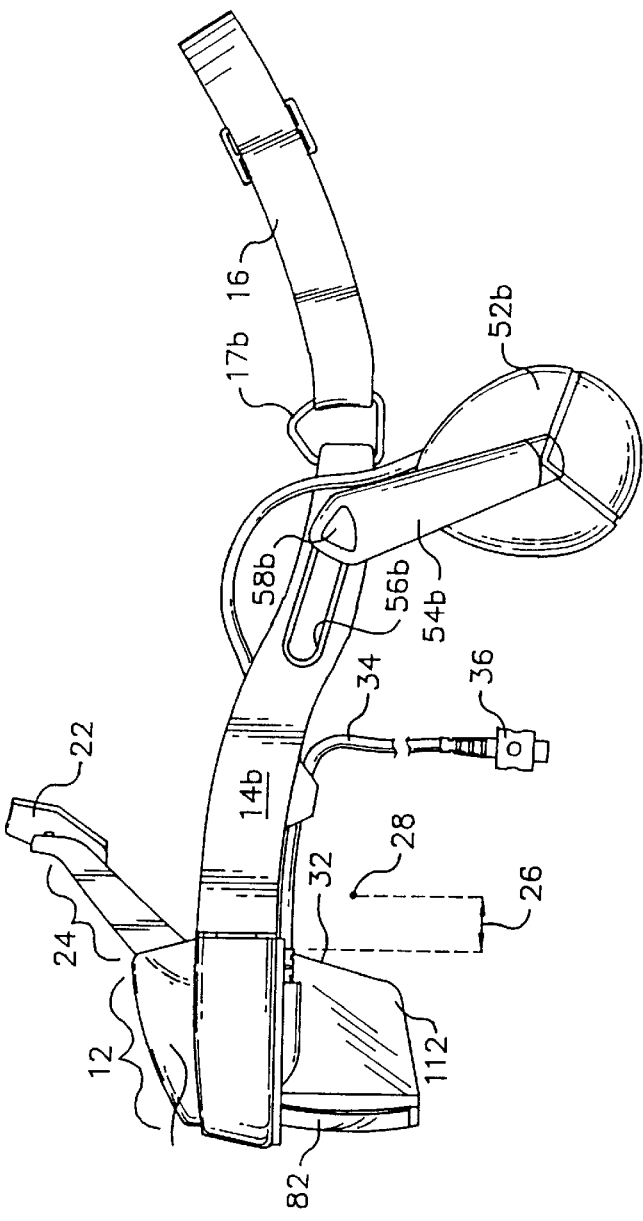
FIG. 5 is a left side elevational view of the apparatus of FIG. 1.

As depicted in FIG. 1, one embodiment of the present invention provides a main component 12, preferably containing some or all of the electronics or optics used for the visual display and left and right temple pieces 14a, 14b. The temple pieces may be used for assisting and holding the main portion 12 in the desired position to deliver video output to the user's eyes. A strap 16 can be provided to further assist in holding the apparatus in the desired position with respect to the head 18 of the user. A forehead brace 22 can be provided to further assist in proper positioning of the main portion 12. The forehead brace 22 is useful to transfer some of the weight of the apparatus to the user's forehead. This may provide, a more comfortable configuration than having substantially all of the weight transferred via other components such as the temples 14a, 14b, headstrap 16 and/or a nose bridge piece such as may be used in some devices. As can be seen in FIGS. 4 and 5, the forehead brace 22 extends back a distance 24 from the main portion 12 of the apparatus. As a result, there is an amount of space 26 between the eye position of the user 28 and the portion of the apparatus 32 which resides in front of the user's eyes sufficient to accommodate the user's eyeglasses, e.g., about one inch or more (in one embodiment, about 28 mm). A connection is provided for establishing communication or data transfer to the display apparatus which, in the depicted embodiment, involves a cable 34 mounted along the underside of the left temple piece 14b and terminating in a connector 36. Typically, the connector 36 will be connected to a cable which provides for data transfer or other communication with a video/audio source 38 (FIG. 17) such as a computer, a video cassette recorder (VCR), video disk player, broadcast television receiver, television cable or optical fiber source, gaming device, or video telephone service. Preferably, the cable 34 is also used to deliver power to the apparatus. In other embodiments, data communication can be made without using a wire cable, such as by using a fiber optic cable, or by using wireless communication such as infrared, or radio communication.

In some embodiments, it is useful to provide the user with controls. Although it is possible to provide controls which are not mounted on the head-mounted unit (such as a remote control unit or a console) in the depicted embodiment, at least some controls are on the head-mounted unit. In the depicted embodiment, a first button 42 can be used to provide, for example, a mute function. Preferably, activation of this button provides for both discontinuing the video image which is currently being output and discontinuing the audio to provide both a video mute and an audio mute. However, it is also possible to provide for controls that mute video only or that mute audio only. Preferably, the mute control is configured so that the user can easily turn off at least the image, without requiring turning off of power to the HMD or interrupting the stack of data (although, in one embodiment, the mute button can be configured to simultaneously pause the data stream). In one embodiment, the mute control turns off power for the LCD backlight, LCD and/or audio functions. Preferably, the current control setting, e.g., monoscopic/3-D, volume, contrast) are still maintained, allowing the user to quickly return to viewing e.g., without having to reset the controls.

In the depicted embodiment, a rocker switch 44 can be used to provide control of a parameter which varies through a range, such as volume of the audio. Other items that could be controlled in the fashion include tint, hue or contrast of the video image, selection of a video and/or audio source such as channel selection, image brightness, audio tone (i.e., treble/bass control) and the like. A slider switch 46 can be used, e.g., to select among discrete choices to select left, right or no relative frame phasing, to select between stereo and non-stereoscopic views, and the like. One or more visible displays can be provided. In the depicted embodiment, an LED "power on" indicator is provided. Other controls and/or indicators can also be used and can be mounted on various surfaces of the head-mounted apparatus of FIG. 1.

Left and right loudspeakers 52a, 52b are preferably movably attached to the ends of the temple pieces 14a, 14b, e.g., by pivotable arms 54a, 54b which can be laterally adjusted in a mounting slot 56a, 56b in each temple 14a, 14b. The speakers 52a, 52b can be held in position by friction or detent tightners 58a, 58b can be used to secure the speakers 52a, 52b in the desired position. Cables 62a, 62b are used to provide the desired signal to the loud speaker 52a, 52b. The head strap 16 is preferably coupled to the temples 14a, 14b via left and right strap pivots, loops or D-rings 17a, 17b. A length and/or tightness adjustment mechanism such as a buckle, can be provided on the strap 16.

Figure 7:
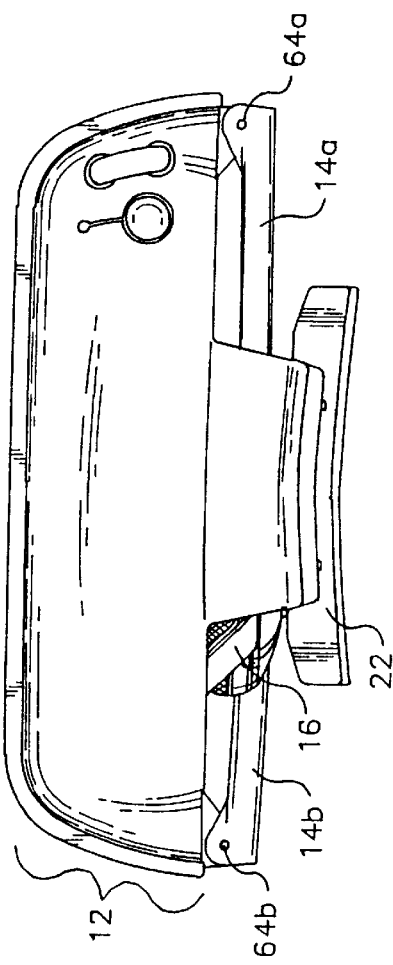
FIG. 7 is a top view generally corresponding to that of FIG. 6 but showing the temple pieces in a folded configuration.
Figure 6:
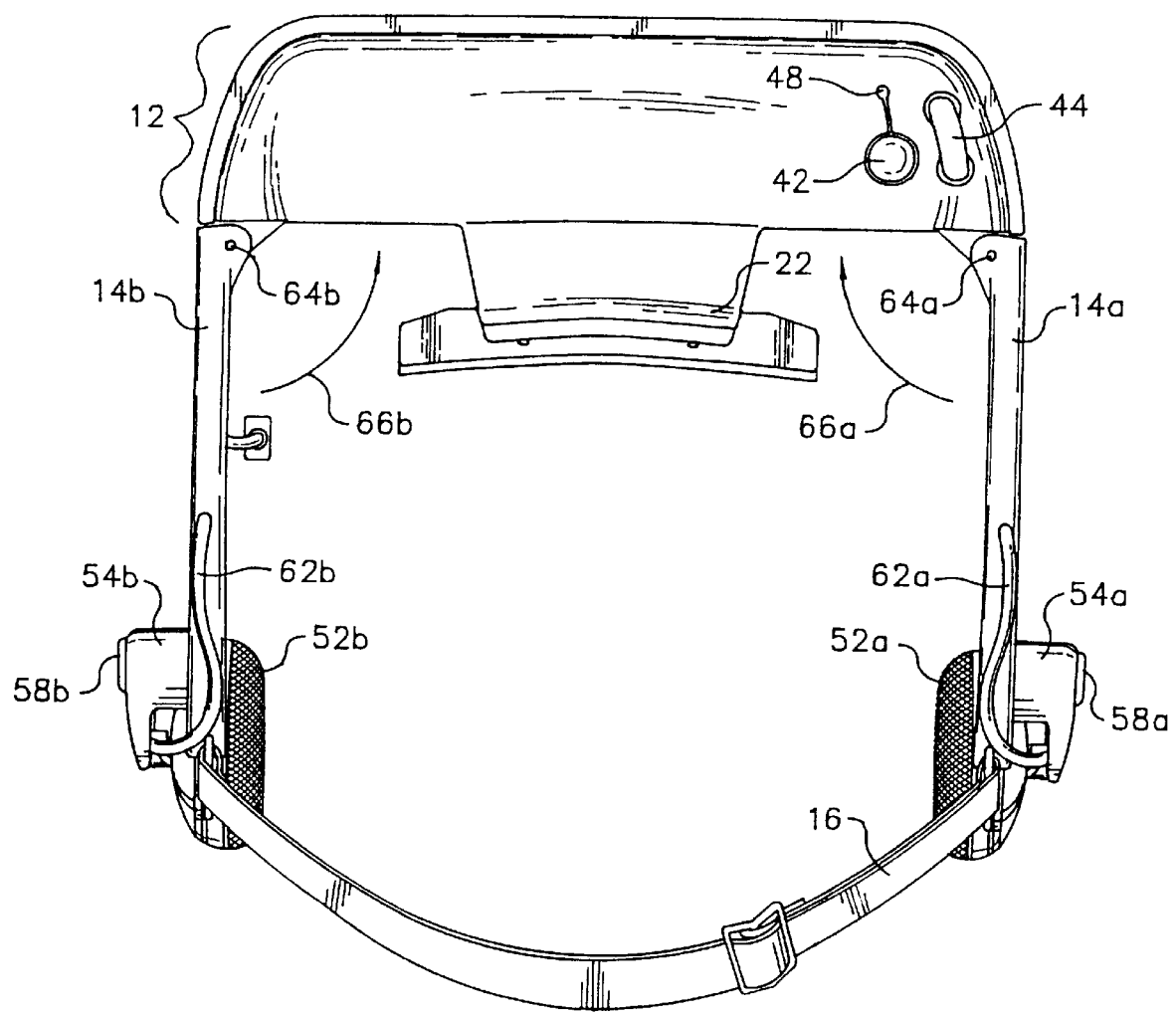
FIG. 6 is a top plan view of the apparatus of FIG. 1.

Preferably, the temples 14a, 14b are connected to the main portion 12 using left and right hinges 64a, 64b. The hinges 64a, 64b permit the temple pieces 14a, 14b to be folded in directions inwardly 66a, 66b to provide the compact configuration depicted in FIG. 7. The compact configuration is achieved partially by locating much or all of the electronics associated with the production of the video device in the main portion 12 (as described more fully below). In one configuration, there are little or no optical or video elements or electronics in the temple pieces 14a, 14b (although in some embodiments these may contain, for example, cables and connectors). As a result, the temples 14a, 14b can be folded nearly flat against the main portion 12, as depicted in FIG. 7, residing underneath the forehead brace 22. Such compact configuration provides for ease of shipment, storage, transport and the like. In one embodiment, the electronics used in generating the image 72 are substantially all contained in the upper portion of the main section 12 of the apparatus as depicted in FIG. 8. The electronics used for this purpose can be those generally well-known in the art for producing video images, such as the electronics used in producing video images in the eyepiece of a video recorder and can include, for example, power supply, timing circuitry (e.g. to assure that the data which arrives is routed to the proper position of the image generators), buffer memory or other memory devices, and/or image processor cirucitry. The electronic signals constituting the video signal are converted into an image, or a series of images, e.g., simulating motion, by an image generator 74. The image generator 72 can be any of a plurality of color or monochrome imaging devices including a cathode-ray tube (CRT), light emitting diode (LED) array, liquid crystal display (LCD), field emissive device (FED), as well as laser devices such as laser diode arrays.

One example of an LCD that can be used for this purpose is a 0.7" diagonal LCD of the type commonly used for the view finder of a camcorder, for example, Model FO7KM200 available from Seiko Epson Corporation. Other sizes and types of LCDs can also be used such as a 1 inch diagonal LCD available from Hitachi, Inc. Preferably, an LCD device includes the capability for being backlit using any of a number of backlighting devices such as incandescent lighting, fluorescent lighting, electro-luminescent and ambient lighting.

Once the image generator 74 generates the optical image, the light from the image generator is configured by various optical elements to deliver the desired image to the eye position 28 of the user. A number of different optical configurations can be used for this purpose including those described in U.S. Ser. No. 08/150,996 filed Nov. 12, 1993 now U.S. Pat. No. 5,406,805 for "Optically Corrected Helmet Mounted Display," a divisional of U.S. Pat. No. 5,303,085, filed Feb. 7, 1992, both of which are incorporated herein by reference or PCT application No. PCT/US94/09819 (attorney docket 16486-5PC) for "Personal Visual Display" filed on an even date herewith and incorporated herein by reference. In the embodiment depicted in FIG. 8, the optical devices include the image generator 74, a field correction device such as a plano-convex or meniscus lens 76 for providing a substantially flat field of focus to the user, a fold mirror 78 for reflecting at least a part of the image from the image generator towards a combiner 82 which reflects at least a portion of the image received from the fold mirror 78 through the fold mirror 78 and towards the eye position of the user 28, preferably magnifying the image (e.g., by virtue of a reflection from its substantially spherical surface) and, in embodiments where the combiner is at least partially transparent, combines the image light with light from the environment to provide the user with a simultaneous view of the environment and of the generated image. Preferably, the combiner serves as the primary magnification element for the image light. An optical element is referred to as being a "powered" element if it provides image magnification. Although, for convenience, this item is referred to as a "combiner", in some embodiments the combiner may be used without providing for a combination of image light with environmental light, as described more fully below.

In the depicted embodiment, the image generator 72 is mounted substantially above the fold mirror 78 (meaning vertically above, when the device is oriented so that the axis between the eye position 28 and combiner 82 is substantially horizontal). With reference to this configuration, the image light travels downward from the image generator 2 towards the fold mirror 1. The image light is at least partially reflected by the fold mirror 1 in a substantially horizontal direction away from the eye of the user 5 and towards the combiner 4. At the combiner 4, the image light is at least partially reflected back towards the fold mirror 1. In an embodiment in which the user will simultaneously view the image or the environmental light, light from the environment passes through the substantially transparent combiner 4 and travels along with the image light reflected from the combiner 4 to produce combined light. In an embodiment in which the user will view only the generated image, without being able to view the environment (referred to as an "immersive" device), the combiner can be substantially fully reflective and substantially non-transmissive. The image light and/or the combined light is at least partially transmitted through the fold mirror 1 towards the eye of the user 5. The amount of light, if any, which passes from the surrounding environment to the eyes of the observer can be at least partially controlled by the coatings placed on the surfaces of the combiner, and the fold mirror.

In many applications, it is desired to provide the user with the impression of a color image. Full color images can be acheived by displaying discrete color components, such as red, green and blue components. Most current technologies for providing a color video image are arranged so that the various component colors are displaced from one another either in space or in time. For example, in a typical television screen, the red, green and blue positions for a given image pixel form a pixel triad displaced in space, i.e., which lie adjacent one another rather than at the same location. This necessarily increases the average size of the pixel triad with the result that pixel density is less intense than it would otherwise be.

Another approach is the approach of displacing the component colors in time such that the red, green and blue colors for a given pixel all are provided in the same location but at different times. Thus, in a configuration in which it is desired to provide the colored image at a rate of 60 frames per second, each frame would be divided into three subframes, one for each color so that subframes would be presented at a rate of about 180 times per second in a repeating pattern of e.g., a red frame, a green frame, a blue frame, a red frame, etc.

One method of achieving the displaced-in-time color image is by using a color shutter. A color shutter is an electronically-driven device which provides a color filter over the entire image area and which can be switched rapidly, e.g., 180 times per second among the three image colors (red, blue, green). One type of color shutter is that provided in Tektronix EX100HD 1 inch Color Display System. Such a color shutter can be mounted directly on the surface of the screen of a monochrome (or black and white) video image generator. The monochrome image generator is then configured to produce a black and white image of the respective color components of the desired final image at, e.g., 180 frames per second. In this way, to produce the first (red) subframe, the black and white image generator will produce a black and white image of the red component of the first frame of the image and the color shutter will be configured to transmit only red light. During the next subframe, 1/180 of a second later, the monochrome generator will generate a black-and-white image of the blue component of the image and the color shutter will be configured to transmit only blue light. During the third subframe, the monochrome image generator will output a black-and white image of the green component of the frame and the color shutter will be configured to transmit only green light. The resulting image will appear to be fully colored to the user but the three colors for a given pixel will be in exactly the same location, i.e., there will be no physical separation of the location of the color components of the pixel.

Although a color shutter approach is useful to provide a high-intensity color image, it has not been previously provided in the context of a light-weight, high-quality, head-mounted display. Typically, optical configurations in the past have used, e.g., a monochrome CRT in conjunction with relay lens systems to transfer the image from a remotely-mounted CRT to the user's eye. This typically resulted in heavy systems, often of a type that were helmet-mounted and suitable cheifly for military use.

It has been found that it is difficult to satisfactorily position and align a color shutter over a substantially curved surface such as that of lens 86. In most cases it has been found that such positioning creates a very small viewing aperture, making the use of the device difficult and uncomfortable. Accordingly, one embodiment of the present invention departs from the approach of positioning a color shutter directly on an output screen and, instead, positions a color shutter 88 at a position which is farther along on the optical path, such as the position depicted in FIG. 9. As depicted in FIG. 9, the color shutter 88 can be placed between the fold mirror 78 and the eye position 28 of the user. This avoids the difficulty of locating the shutter over a curved surface 86 and avoids placing the color shutter in a region, such as the region between the fold mirror 78 and the combiner 82, which has optical paths going in more than one direction (so that the filter would conceivably filter the light twice). As depicted in FIG. 9, if the color shutter 88 is positioned below the lens 86, it would be necessary to increase the height 92 of the device in order to avoid interfering with the double-filtering the light between the fold mirror 78 and the combiner 82. Increasing the height of the device will result in a reduction of magnification or reduction of the viewing aperture.

It has been found that a number of items can detract from the delivery of a high-quality image to the user. The image can deteriorate because the image generator or various optical elements are not located in the correct position with respect to one another and/or with respect to the user's eye position. The image can deteriorate because stray light, i.e., light other than that desired to be delivered to the user may be combined with the image and/or desired environmental light. In order to achieve the goals of low cost and low weight while maintaining high quality, an embodiment of the invention provides for an optical shroud which can be used for the dual functions of shielding from stray light and providing for correct positioning of optical elements. In the embodiment depicted in FIG. 10, the shroud 112 has a top surface 114 having an opening 116 for entry of the image light. Beneath the top portion 114 is a chamber 118 defined by left and right sidewalls 122a, 122b and floor member 124. As seen in FIGS. 11 and 13, the side members 122a, 122b preferably flare outward (i.e., in a direction away from the eye position, e.g., at an angle 124' (with respect to the straight-ahead axis of view of the user 128) of between about 10° and about 30°, preferably between about 10° and about 25° and more preferably being about 15°. The top of the shroud 114 in the depicted embodiment, defines a plane 131 which is substantially parallel to the plane of the image generator output. In the depicted embodiment, the floor 124 is flared downward at an angle 132, with respect to the top plane 131, of between about 10° and about 25°, preferably between about 10° and about 20° and more preferably at about 12°. A groove near the front edge of the floor 134c is curved with a curvature corresponding to that of the combiner. This groove is used, in conjunction with recesses 134a and 134b, for mounting the combiner so as to assure that the combiner 82 is located in the correct position, as depicted in FIG. 13B. After positioning, the combiner can be held in place by, e.g. adhesives, ultrsonic welding, interlocking tabs and slots, latches, gaskets and the like. Ledges 136, 137a, 137b, defining an imaginary plane which intersects the sidewalls 122a, 122b along lines running diagonally inside of the sidewalls, are used for mounting the fold mirror 78 in the correct position with respect to the other optical components, as depicted in FIG. 13B. After positioning, the fold mirror can be held in place by, e.g. adhesives, ultrsonic welding, interlocking tabs and slots, heat staking, latches, gaskets and the like. The top 114, floor 124 and sidewalls 122a, 122b, and particularly, the floor 124 and outside sidewall are particularly useful in shielding the optics from stray light of types that commonly produce image degradation. An example of such stray light would be light that may bounce upward off a light-colored shirt of a user. The shroud also protects the optical components from dust, abrasion, scratches and the like, at least on the surfaces of the optics enclosed within the chamber 118. To assist in protecting the optics, a transparent dust cover 141 can be positioned e.g. between the fold mirror 78 and the eye of the user.

In the depicted embodiment, pins 152a, 152b, 152c projecting from the upper surface 114 assist in proper alignment of the field curvature correction device such as plano-convex lens 76, e.g. by mating with corresponding holes 154a, 154b, 154c in the lens 76. The lens 76 can be attached to the shroud 12 by heat staking or heat-doming the ends of the pins 152a, 152b, 152c or by other means such as adhesives, ultrasonic welding, clamps, latches and the like. Tabs 156a, 156b, 156c are provided for aligning and/or attaching the shroud 112 to the main portion 12 of the head-mounted display device.

In one embodiment, separate shrouds 112 are provided for the left and right optics, as depicted, e.g., in FIG. 1, although a unified shroud can also be used. Although the depicted embodiment shows recesses 134a, 134b, groove 134c, ledges 136, 137, 139 and pins 152a, 152b, 152c for aligning and/or holding various optical components, other devices for holding can be used such as tabs, ridges, tracks, rails, spring-mounts, gaskets, latches and the like. The shroud 112 can be made from a number of components, including plastic, metal, ceramic, fiber-reinforced resins, and the like. The shroud 112 may contains holes, slots or other shapes to facilitate connecting the shroud to other optics (such as contrast-enhancement optics) in the correct position with respect to other items in the device.

Figure 14A:
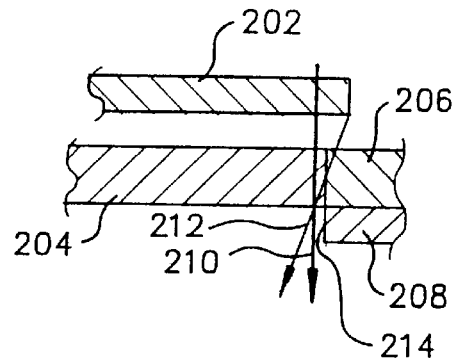
FIG. 14A is a schematic, cross-sectional view of a mask and holder apparatus according to one embodiment of the present invention.

Another alignment issue is presented by the image generator. The image generator, must, of course, be correctly positioned with respect to the other elements such as a field correction lens 86, fold mirror 78, etc. Certain image generating devices, notably an LCD array, suffer from image degradation as a result of transmission of light peripheral to the image area of the LCD. Typically, an LCD is backlit and many LCDs have used a rectangularly-shaped mask around the edge of the LCD to prevent the viewer from seeing a bright outline surrounding the active area of the LED. Because of the fact that an LCD has a thickness (typically about 2.5 mm) undesired light, e.g., from the backlight, which is typically not collimated, can travel through the LCD at an angle other than normal to the output plane to the LCD and thus a mask on the output plane which went only up to the active area of the LCD would not fully mask the undesired light. FIG. 14A depicts a cross-section through a backlight 202, active LCD area 204, peripiheral LCD circuitry 206, and mask 208. As seen in this configuration, if the only light travelling through the LCD 204 were travelling in a normal direction, such as that shown by arrow 210, the mask 208 would be fully effective. However, because light travels from the backlight 202 in directions other than normal to the plane of the LCD 204, some light 212 will travel obliquely through the LCD 204, missing the mask 208. For this reason, in previous devices, in order to avoid the undesired oblique light around the edges of the LCD, the mask 208 would typically be provided with an opening 214 which was smaller than a full active area of the LCD. This represented a certain amount of waste of the image generated by the LCDs since the edge of the LCD image would be masked.

Figure 14B:
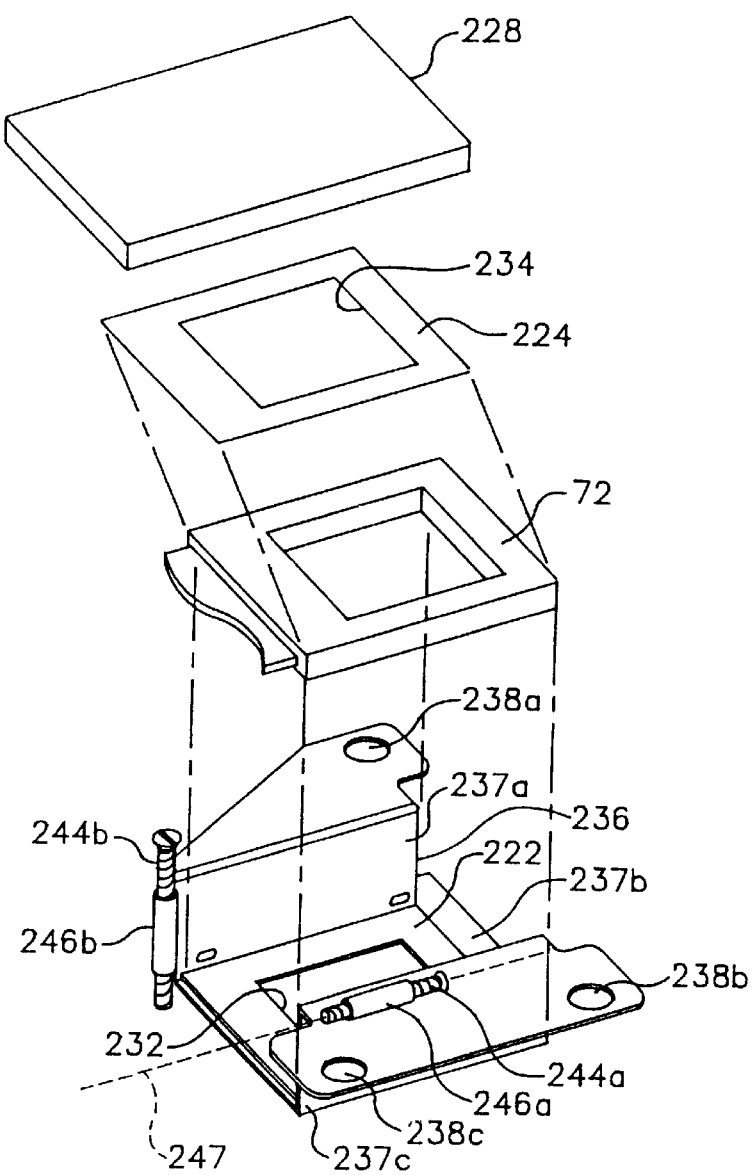
FIG. 14B is an exploded perspective view of a mask and holder apparatus according to one embodiment of the present invention.

Accordingly, one embodiment of the invention involves providing at least two masks, one mask 222 (FIG. 14B) adjacent the output surface of the LED 72 and another mask 224 between the LCD location 226 and the location of the backlight 228. Preferably, both the first mask 222 and the second mask 224 have opening or windows 232, 234, respectively, which are substantially equal and congruent to the active area of the LCD.

Preferably, the first mask 222 is formed integrally with a holder 236 which includes sidewalls 237a, 237b, 237c for properly aligning the second masks 222, 224 and/or the LCD device 72 to provide an accurate and inexpensive way to perform both masking and proper positioning and alignment of the masks with respect to the LCD array. Alternatively it is possible to provide both the masks 222,224 as part of a unitary mask/LCD-holder. In one embodiment, the mask/holder also contains holes 238a, 238b 238c for mounting the holder to the main portion 12 of the head mounted display device. It is also possible for the holder 236 to include devices (such as screw holes, bosses, grooves, rails and the like, not shown) for mounting items such as the image source, backlight, lenses, etc.

In one embodiment, the mask/holder 236 is provided with a means for adjustably mounting the mask/holder within the main portion 12 of the apparatus. Adjustability is useful in order to avoid image disparity between the two eye positions. Part of the image disparity results from the fact that the active area of an LCD due to manufacturing tolerances, may not be precisely located in the same position, with respect to the device edges, on every LCD device. The variability is typically within about ±0.25 mm in both horizontal and vertical directions. Although it is possible to provide for adjustment of both horizontal and vertical disparity, it has been shown that human vision is not as sensitive to horizontal disparity (i.e. disparity wherein corresponding portions of the left and right images appear to the viewer to be displaced from one another along a left-right axis) as it is to vertical disparity (i.e. disparity wherein corresponding portions of left and right images appear to the viewer to be displaced from one another along an up-down axis). Accordingly, in the depicted embodiment, in order to e.g., eliminate eyestrain which can result from vertical disparity of the left and right images, an optional adjustment mechanism such a travelling screw arrangement 244a can be provided for vertical alignment of the two images. By rotating the screw 224a, the traveller 246a, attached to the holder 236 will move vertically up and down (i.e. along axis 247) and the desired vertical adjustment can be achieved in this fashion. Other ways of achieving vertical disparity adjustment include use of rack and pinion adjustment, shims, and tilting the combiner (at the cost of introducing other distortions). A similar adjustment mechanism 244b, 246b can be provided for adjusting the focus of the image for one eye with respect to the other.

Figure 15:
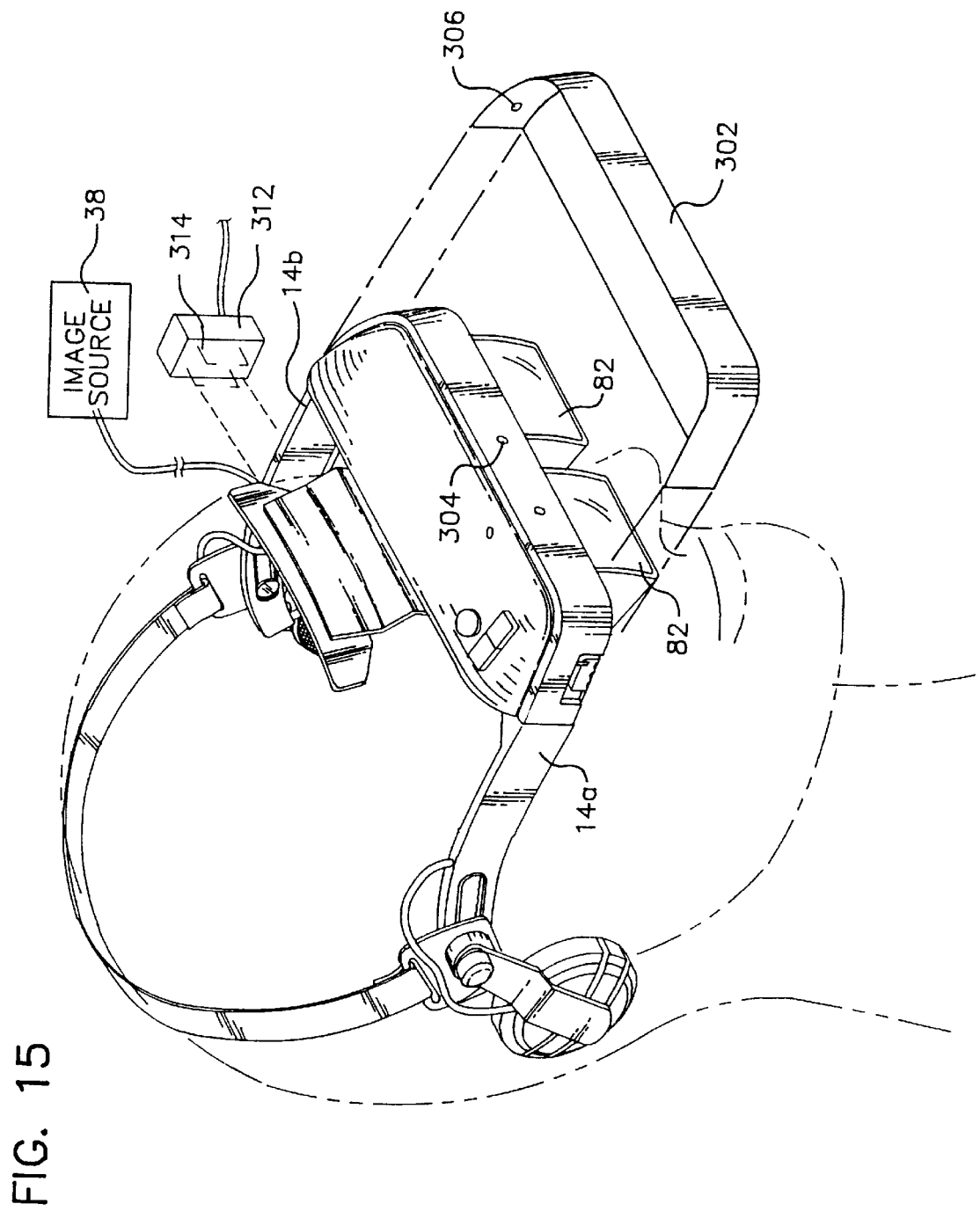
FIG. 15 is a perspective view of the apparatus of FIG. 1 showing attachment of additional components.

Some uses for a head mounted display make it advisable to provide the user with a simultaneous view of the environment and a generated image. Other uses make it preferable to provide a view of the image alone, exclusive of the environment. As noted above, in one embodiment the environmental view can be provided by using the combiner to combine image light with light from the environment. It is possible to provide a fully reflective, substantially spherical mirror so as to provide an image-only or "immersive" device. Preferably, however, the apparatus can be used to provide either type of image as desired by the user. It is believed to be particularly useful to leave the user with the option of achieving a view of the environment since users may need such a view in order to properly and safely move while wearing the apparatus. In the embodiment depicted in FIG. 15, a shield 302 is configured so that it can snap over the external area of the combiner 82, thus converting an environmental-view device (also called "see-through", "transmissive" or "heads-up") into an immersive view device. The shield can be held in place by a number of mechanisms such as snaps 304, or by tab and slot devices, hook and loop devices such as that sold under the tradename VELCRO®, or various latches or pivots (such as a flip-up shield). The shield 302 can be made from a number of materials including plastics, metals and the like.

In addition to providing for a shield which can be added or removed mechanically, the transmissivity of light through the combiner 82 can also be controlled by other devices such as an electro-mechanically controlled iris, a photochromically activated coating or an electrically activated coating.

In many uses of a head mounted display, it is desired to collect information regarding the position, posture, location and/or movement of the user's head. This information can be used to control the image generated to the eyes of the user for a number of purposes, such as to provide a "virtual reality" or simulated environment to the user, to allow the user to navigate through various displayed images to observe a simulated object from various angles and the like. A number of tracking devices can be used for this purpose such as inertial tracking, electromagnetic tracking, Hall effect tracking, magneto resistance tracking, electrolytic tilt sensing and flux gate tracking. According to one embodiment of the invention, tracking devices are configured so as to permit the user to attach and detach the tracking devices as desired. In the embodiment depicted in FIG. 15, a tracking devices 312, can be attached to either of the temples 14a, 14b of the apparatus, e.g., using flexible hook attachments 314, configured to engage the edges of the temples 14a, 14b. Other attachment devices that can be used include latches, clamps, and/or hook and loop material (such as that sold under the tradename VELCRO®. One tracking device which can be used for this purpose is a product sold under the trade name The Bird™, by Ascension Technology Corp. In the depicted embodiment, the tracker 312 has its own cable for transmitting information, e.g., to a computer. It is also possible to provide for couplers and wiring to route the tracking Information over the HMD cable, to reduce the number of separate cables involved. Although a snap-on or otherwise removably mountable tracker leaves the user with the option of doing without the bulk and weight of trackers when trackers are not desired, in another embodiment, one or more trackers can be integrally built into the head-mounted display device.

In view of the above description, a number of advantages of the present invention can be seen. The present invention provides for a high quality image in a head-mounted display at low cost and low weight. The device can be easily stored and transported, provides for comfort for the user, because of its low weight and mounting facility, can provide controls for video and audio is easily adjustable to accommodate the user's head size and ear and eye location, provides a high intensity, preferably color image, provides for ease of alignment, manufacture, design and repair, provides for ease of control by the user such as controlling video, audio or immersive characteristics and permits the user to select whether tracking is attached.

A number of variations and modifications of the invention can also be used. Although the device depicted is binocular, a monocular device can also be used. More or fewer controls than those depicted can be used. A number of aspects of the invention can be used without providing other aspects, for example, it is possible to provide for the eyeglass-like fold-up style without providing for a color shutter.

Although the invention has been described by way of a preferred embodiment and certain variations and modification, other variations and modifications can also be used, the invention being defined by the following claims.

What is claimed is:

1. A head-mounted visual display apparatus for a user, comprising:

an image generator, which outputs image light;

optical elements configured to receive said image light from said image generator and provide said image to the eye position of the user;

a holder configured to mount the image generator and optical elements to the user's head including temples with upper edges defining a first common plane and a brace configured to contact the user's forehead at a contact location above said first plane.

2. Apparatus as claimed in claim 1, further comprising a strap for holding said brace against the user's forehead.

3. Apparatus, as claimed in claim 2, further comprising means for adjusting the effective length of said strap.

4. Apparatus, as claimed in claim 2, wherein said strap is coupled to said holder using a loop.

5. Apparatus, as claimed in claim 1, wherein said brace includes at least a portion being pivotable with respect to said holder.

6. A head-mounted visual display apparatus for a user, comprising:

an image generator which outputs image light;

optical elements configured to receive image light from said image generator and provide such image to the eye position of the user;

temples with upper edges defining a first common plane;

a holder configured to mount the image generator, optical elements and temples to the user's head; and brace means configured to contact the user's forehead at a location above said first plane.

* * * * *